United States Patent [19]

Williamson et al.

[11] Patent Number: 4,858,698
[45] Date of Patent: Aug. 22, 1989

[54] WEIGHT TRANSFER LINKAGE ARRANGEMENT

[75] Inventors: Gerald E. Williamson, Davenport, Wash.; Donald R. Hartwig, Rock Island, Ill.

[73] Assignee: Yetter Manufacturing Company, Colchester, Ill.

[21] Appl. No.: 207,137

[22] Filed: Jun. 10, 1988

[51] Int. Cl.$^4$ .................... A01B 63/11; A01B 59/00
[52] U.S. Cl. .................... 172/448; 172/439; 172/677
[58] Field of Search ............. 172/624.5, 484, 470, 172/449, 417, 678, 679, 680, 439, 448, 443, 307, 248, 677, 430; 111/52, 7; 280/456 A, 460 A, 461 A

[56] References Cited

U.S. PATENT DOCUMENTS

| | | | |
|---|---|---|---|
| 3,218,999 | 11/1965 | Pattison | 111/7 |
| 3,295,482 | 1/1967 | Dountas et al. | 111/7 |
| 3,358,777 | 12/1967 | Groenke | 172/677 X |
| 3,378,279 | 4/1968 | Jacobs | 111/7 X |
| 4,116,283 | 9/1978 | Blessent | 172/443 |
| 4,236,613 | 12/1980 | van der Lely | 172/261 X |
| 4,660,652 | 4/1987 | Moos et al. | 172/260.5 |
| 4,677,922 | 7/1987 | Shrull et al. | 111/52 |

*Primary Examiner*—Richard J. Johnson
*Assistant Examiner*—Jeffrey L. Thompson
*Attorney, Agent, or Firm*—Mann, McWilliams, Zummer & Sweeney

[57] ABSTRACT

A weight transfer linkage arrangement for connection between the three-point hitch of a tractor, a tool bar carrying agricultural implements and a hitch. The linkage arrangement includes a first parallel linkage connecting the tool bar and the hitch and a second parallel linkage connecting the three-point hitch of the tractor and the tool bar. The first and second linkages are both adaptable to be moved between corresponding cooperative lowered and raised positions, such that the tool bar may be raised and lowered without raising and lowering the hitch. Force applying means are connected to the first linkage to apply downpressure on the tool bar when the linkage arrangement is in a lowered position.

6 Claims, 4 Drawing Sheets

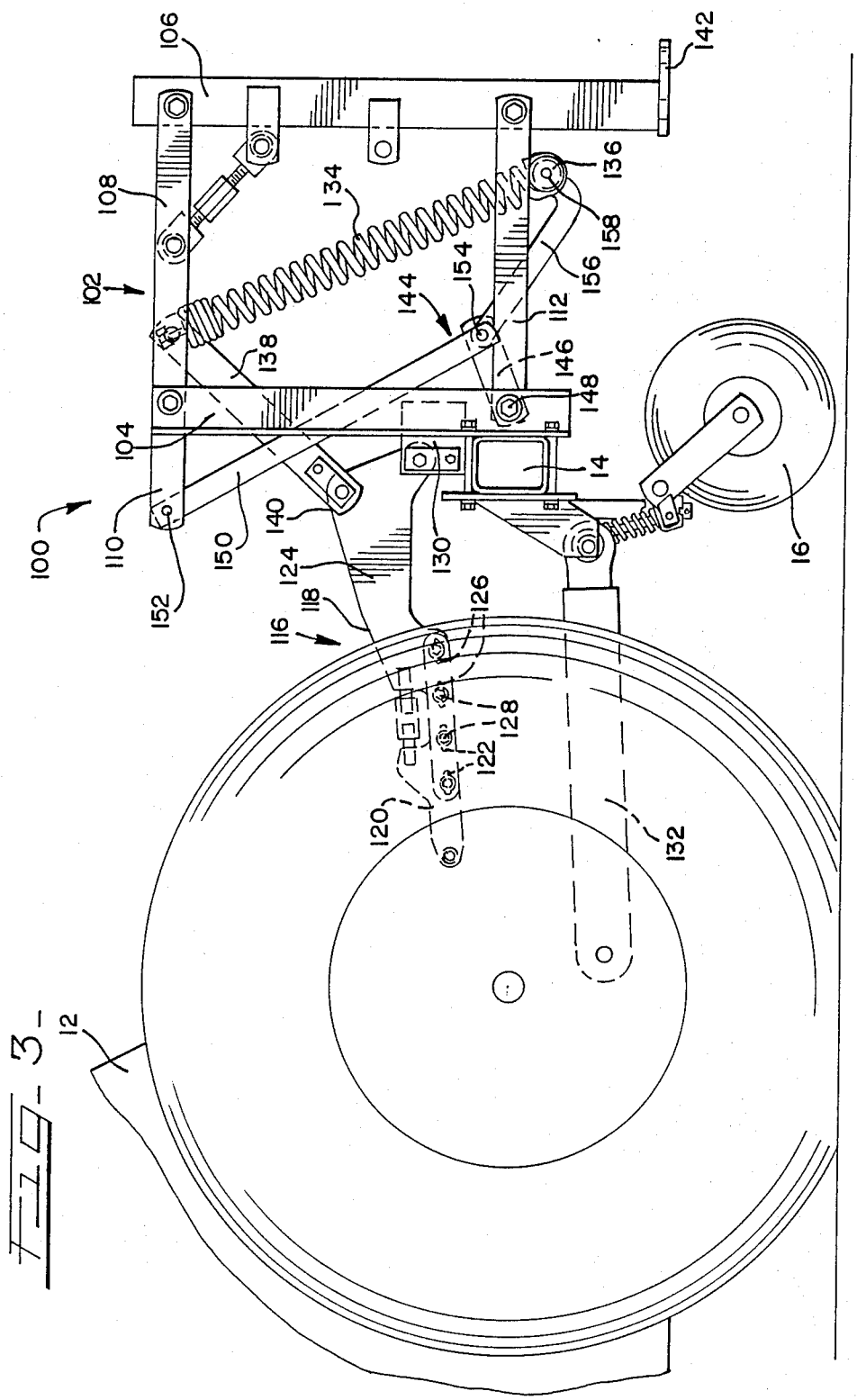

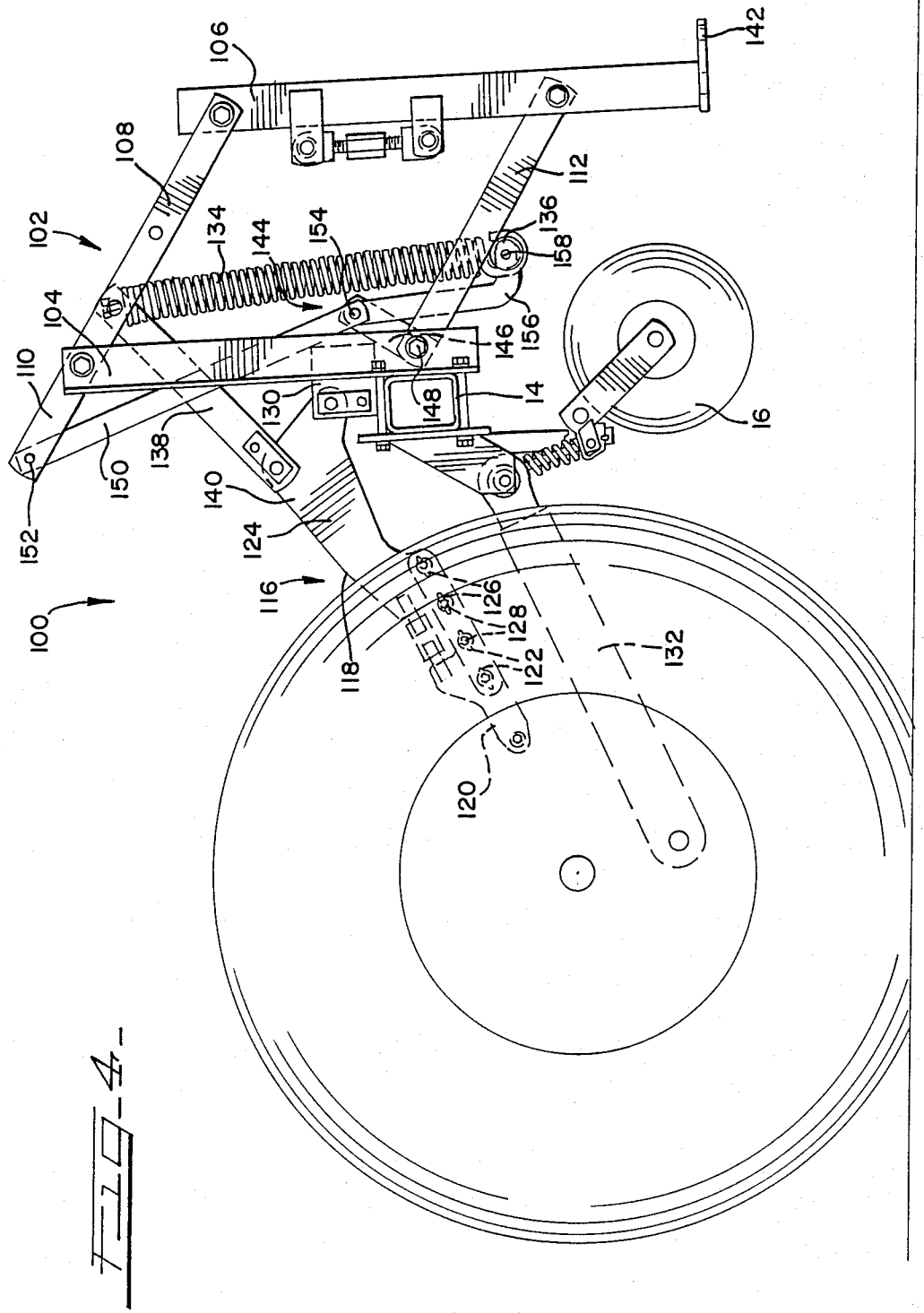

WEIGHT TRANSFER LINKAGE ARRANGEMENT

BACKGROUND OF THE INVENTION

The present invention is directed to linkage arrangements for connecting a three-point hitch of a tractor, a tool bar carrying agricultural implements and a hitch connectable to an agricultural implement. More particularly, it is directed to a linkage arrangement which includes interconnected parallel linkages. Numerous arrangements of this general type are shown in the prior art U.S. Pat. Nos. 1,775,297, 2,531,768, 2,899,776, 3,358,777, 3,708,019, 4,108,089, 4,191,262, 4,391,334, 4,500,105, 4,537,261 and 4,615,396. None of the foregoing patents disclose the features of the present invention.

SUMMARY OF THE INVENTION

The present invention provides a weight transfer linkage arrangement for connecting the three-point hitch of a tractor, a tool bar carrying a first set of agricultural implements and a hitch which is connectable to a second set of agricultural implements. The linkage arrangement includes a first parallel linkage having a pair of first vertical frame members disposed perpendicular to the ground and rigidly mounted to the tool bar. A second vertical frame member is disposed a distance from the first vertical frame members and in parallel relationship thereto. The second vertical frame member supports a hitch at a predetermined vertical height above the ground. The first and second vertical members are pivotally connected at their respective upper and lower ends by pairs of upper and lower horizontal frame members so as to form a parallelogram linkage. A second parallel linkage connects the three-point hitch of the tractor and the tool bar. The second linkage includes a first link member having one end pivotally mounted to the three-point hitch of the tractor and the other end pivotally connected to the first vertical frame member. A pair of second link members, positioned beneath and generally parallel to the first link member, is pivotally attached at one end to the three-point hitch of the tractor and pivotally connected at the other end to the tool bar, such that the first and second link members form a parallelogram type linkage. The second link members are part of the three-point hitch assembly provided with the tractor. The first and second parallel linkages are operable between corresponding cooperative lowered and raised positions. A force-applying means, for example, a coil spring or a hydraulic cylinder, is connected between the first and second horizontal frame members of the first linkage to provide down-pressure on the tool bar when the linkage arrangement is in the lowered position. As the linkage arrangement raises from a lowered position to a raised position, th second linkage raises the first vertical frame members of the first parallel linkage and hence the tool bar, such that the agricultural implements carried by the tool bar no longer engage the ground. However, the second vertical frame member is not raised and the hitch supported thereby remains at the predetermined vertical height above the ground.

BRIEF DESCRIPTION OF THE DRAWINGS

FIG. 3 is a side view of the spring mechanism embodiment of the linkage arrangement of the present invention in a lowered position.

FIG. 4 shows the linkage arrangement of FIG. 3 in a raised position.

DETAILED DESCRIPTION OF THE INVENTION

Figure 1:
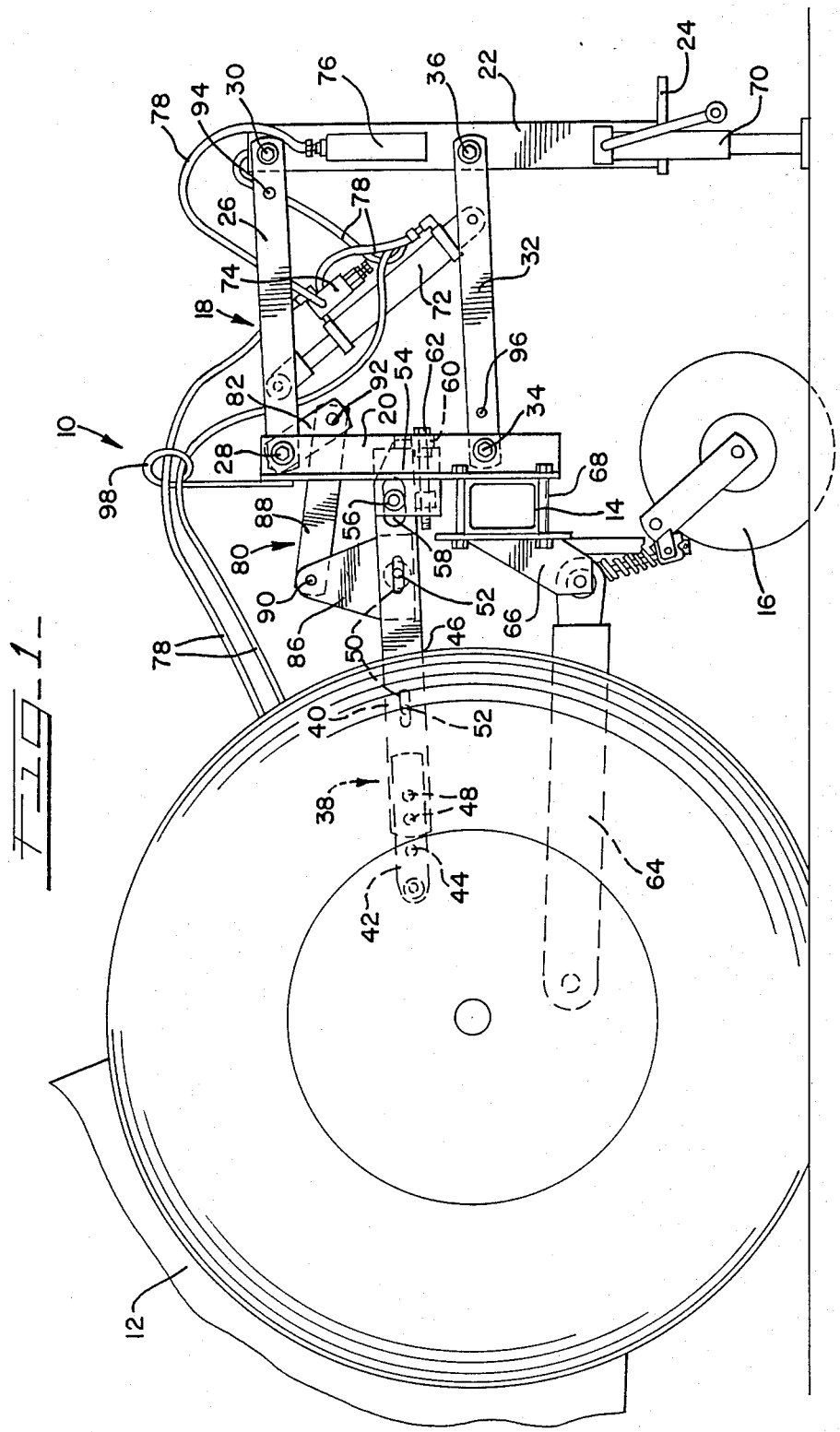
FIG. 1 is a side view of the hydraulic cylinder embodiment of the linkage arrangement of the present invention in a lowered position.
Figure 2:
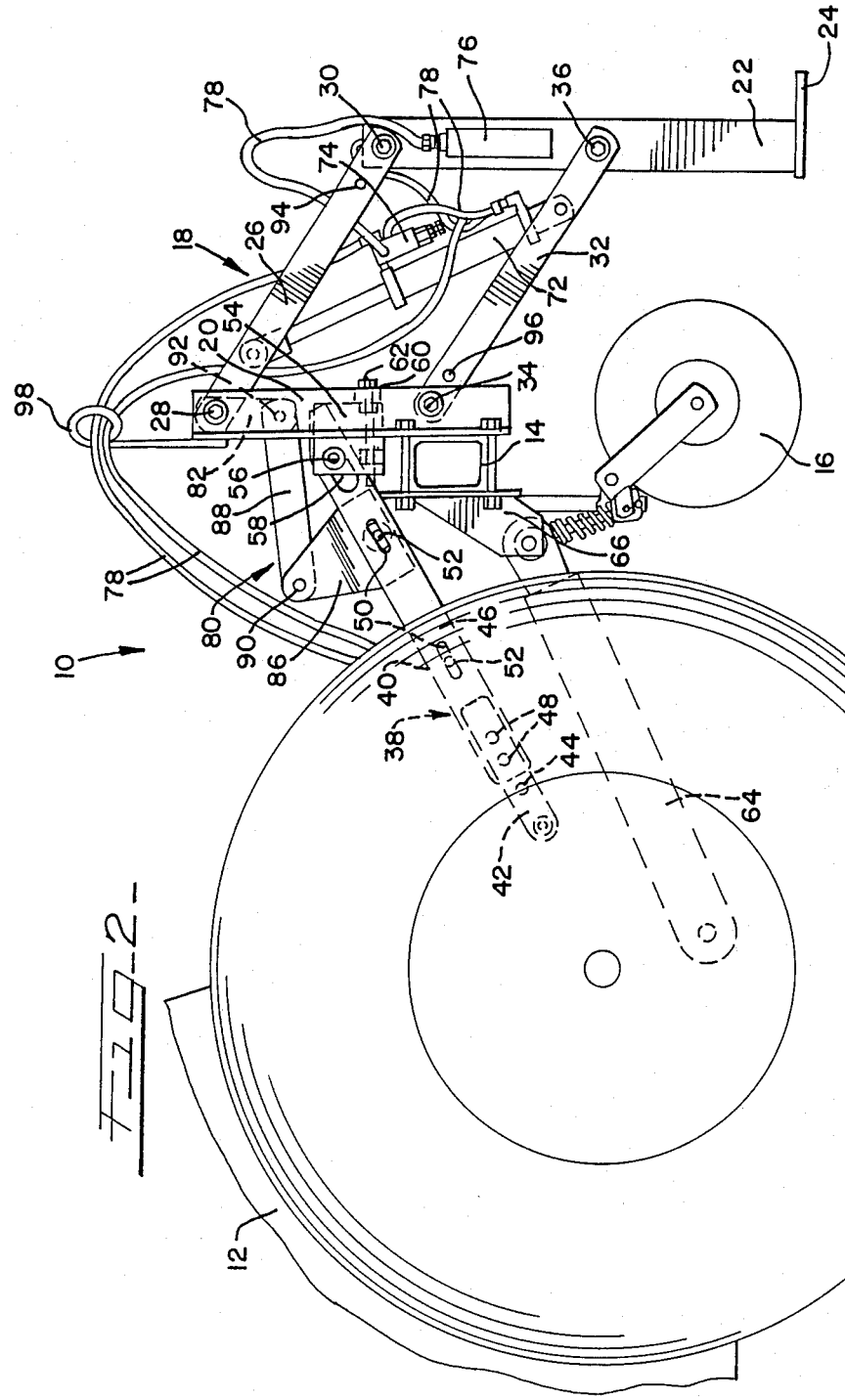
FIG. 2 is the linkage arrangement of FIG. 1 in a raised position.

One embodiment of a weight transfer linkage arrangement, generally designated by the numeral 10, is shown in FIGS. 1 and 2. The linkage arrangement 10 is adapted to be connected to the three-point hitch of a tractor 12 and connected toward the center of a vertically adjustable tool bar 14 adapted to carry agricultural implements 16.

The linkage arrangement 10 includes a first parallel linkage 18 consisting of a pair of spaced first vertical frame members 20 rigidly connected at their lower ends to the tool bar 14 and a second vertical frame member 22 disposed a distance from the first vertical frame members 20 and in parallel relation thereto. The second vertical frame member 22 is longer than the first vertical frame members 20 so that it extends beyond the lower ends of the first vertical members 20. In the embodiment illustrated, the first vertical frame members 20 are spaced angle sections and the second vertical frame member 22 is a rectangular tube. The second vertical member 22 is provided at its lower end with a hitch 24 which is located and maintained at a predetermined height above the ground. The hitch 24 is connectable to an agricultural implement, for example, a grain drill. A pair of first horizontal frame members 26 is pivotally connected at one end to the upper ends of the first vertical members 20 by bolts 28 and at the opposite ends pivotally connected to the upper end of the second vertical member 22 by bolts 30. A pair of second horizontal frame members 32 is pivotally connected at one end to the lower ends of the first vertical members 20 by bolts 34 and at the opposite end pivotally connected by bolts 36 to the second vertical member 22 at a point approximately midway between the upper and lower ends thereof, such that the second horizontal members 32 are disposed in parallel relation to the first horizontal members 26. The first and second vertical members 20 and 22 and the first and second horizontal members 26 and 32, form a parallelogram type linkage.

A second parallel linkage 38 is adaptable to connect the first parallel linkage 18 to the three-point hitch of the tractor 12. The second linkage includes a first link member 40 having a front portion 42 provided with a plurality of apertures 44 defined therethrough and a pair of rear portions 46 each provided with a plurality of corresponding apertures 48 therethrough. One of the apertures 44 is aligned with one of the corresponding apertures 48 and a bolt is fastened therethrough to secure the portions 42 and 46 together. The length of the first link members 40 may be adjusted depending on which aperture 44 is aligned with which corresponding aperture 48. A plurality of slots 50 are defined in the rear portion 46 and are adapted to receive bolts 52 which lock the first link member 40 in a fixed length. The free end of the front portion 42 of the first link member 40 is pivotally secured to the three-point hitch (not shown) on the tractor 12. The free ends of the rear portions 46 of the first link member 40 are adjustably secured to the first vertical frame members 20 of the first parallel linkage 18 by means of a mounting bracket 54 disposed between the opposing first vertical frame members 20, such that the first link member 40 is disposed in substantially perpendicular relation to the tool bar 14. A bolt 56 extending between corresponding slots 58 defined at the free ends of the rear portions 46 of the first link member 40, connects the first link member 40 to the mounting bracket 54. A plate member 60 is disposed adjacent the mounting bracket 54 and extends between the pair of first vertical frame members 20. A screw 62 connects the plate member 60 to the mounting bracket 54 and may be adjusted to vary the horizontal position of the first link member 40.

A pair of second link members 64 is disposed below the first link member 40 and in generally parallel relation thereto. The second link members 64 are part of the three point hitch of the tractor 12. One pair of ends thereof is pivotally connected to the three point hitch of the tractor 12 and the opposite ends thereof are pivotally connected to respective mounting brackets 66 which are mounted on the tool bar 14. The mounting brackets 66 are mounted at equidistances from the mounting bracket 54 and are spaced at a greater distance from one another than the distance between the connection points of the ends of the second link members 64 to the three-point hitch, such that the second link members 64 diverge slightly from the three-point hitch connection to the tool bar connection. To facilitate connection of the first link member 40 to the three-point hitch, an adjustable jack 70, as seen in FIG. 1, may be mounted at the lower end of the second vertical frame member 22.

A force applying means, in this embodiment a hydraulic cylinder 72, is connected at an angle between the first and second horizontal frame members 26 and 32 of the first parallel linkage 18. The hydraulic cylinder 72 acts in cooperation with a pressure relief valve 74 attached thereto and with a pair of accumulators 76 disposed on each side of the second vertical frame member 20. Conduits 78 supported by a holder 98 connect the hydraulic cylinder 72 and the pressure relief valve 74 to a remote control located in the operations panel on the tractor 12. Additional conduits 78 interconnect the pressure relief valve 74 with the hydraulic cylinder 72 and the hydraulic cylinder 72 with the accumulators 76.

A third linkage 80 interconnects the first parallel linkage 18 and the second parallel linkage 38. The third linkage 80 includes a first link 82 having one end pivotally connected at bolt 28 between first vertical frame members 20. A second link 86 has its lower end fastened to the first link member 40 of the second parallel linkage 38 and extends upwardly therefrom. A connecting link 88 has one end pivotally connected at 90 to the upper end of the second link 86 and the opposite end pivotally connected at 92 to the end of the first link 82 opposite pivotal connection 28.

The hydraulic cylinder 72 is operable via the remote control to exert downpressure on the tool bar 14 when the linkage arrangement 10 is in the lowered position shown in FIG. 1 through the third linkage 80 interconnecting the first parallel linkage 18 and the second parallel linkage 38.

When it is desired to apply downpressure on the tool bar 14, the operator of the tractor 12 activates the remote control switch for the hydraulic cylinder 72, thereby causing the hydraulic cylinder 72 to retract, as shown in FIG. 1. When the cylinder 72 is retracted, downward force is applied on the first horizontal frame members 26 causing the second vertical frame member 22 to pivot slightly upwardly about pivot connection 30. Since the first link 82 of the third linkage 80 is attached at pivot connection 28 to the first horizontal frame member 26, it will also pivot slightly upwardly such that pivot connection 92, connecting the first link 82 and the connecting link 88, is raised slightly upwardly and the connecting link 88 moves horizontally in a direction toward the second vertical frame member 22, thereby transferring the down force via the third linkage 80 to the first link members 40 of the second parallel linkage 38 at point 56 and consequently to the tool bar 14. There is a direct relationship between the pressure applied to the hydraulic cylinder 72 and the load transfer to the tool bar 14. A hydraulic cylinder attached at an angle between point 94 on the first horizontal frame members 26 and point 96 on the second horizontal frame members 32, will provide the same downpressure and load on the tool bar 14 when it is moved to an extended position. The hydraulic pressure applied to the cylinder 72 may be varied as read on a sight gauge (not shown) mounted at the upper end of the first vertical frame member 20 and extending upwardly therefrom.

It is desirable to have the tool bar 14 float up and down through a limited range when the linkage arrangement 10 is in the lowered or working arrangement shown in FIG. 1 and downpressure is applied to the tool bar 14. However, with hydraulic fluid trapped on both sides of the cylinder 72, it would resist further movement of the tool bar 14 through upward and downward floatation. By securing an accumulator 76 to each side of the second vertical frame member 22 and connecting them to the cylinder 72, the hydraulic oil will move into the precharged accumulator 76 when the tool bar 14 floats up or down, thereby permitting the hydraulic cylinder 72 to maintain downpressure and load on the tool bar 14.

When it is no longer desired to have the agricultural implements 16 carried by the tool bar 14 engage the ground, the linkage arrangement 10 may be raised, as shown in FIG. 2, thereby raising the tool bar 14 and consequently the implements 16 carried thereby out of contact with the ground. The tractor operator first deactivates the hydraulic cylinder 72 remote control so that no pressure is supplied to the hydraulic cylinder 72 and then activates the three point hitch to raise the second parallel linkage 38. Since the first link member 40 of the second parallel linkage 38 is secured to the first vertical frame members 20 of the first parallel linkage 18 and the second link members 64 of the second parallel linkage 38 are secured to the tool bar 14, the first vertical frame members 20 and the tool bar 14 are raised. However, because of the pivotal parallelogram structure of the first parallel linkage 18 and the interconnection of the first parallel linkage 18 with the second parallel linkage 38 through the third linkage 80, the second vertical frame member 22 is not raised with the first vertical frame members 20 and the hitch 24 remains at the same predetermined distance above the ground. Though the hitch 24 does not move vertically, it does move slightly horizontally toward the tractor 12 as the first vertical frame members 20 are raised and the parallelogram collapses. As seen in FIG. 2, when no pressure is supplied to the hydraulic cylinder 72, it extends easily between the first and second horizontal frame members 26, 32 to accommodate the collapse of the parallelogram 18.

However, should the tractor operator forget to deactivate the hydraulic cylinder 72 before raising the tool bar 14, one of two things will occur. In the first instance, if the weight of the tool bar 14 and the agricultural implements 16 attached thereto together with the downpressure on the tool bar 14 exceeds the lift capacity of tractor 12, the tool bar 14 will not raise. In the second instance, if the lift capacity of the tractor 12 exceeds the weight of the tool bar 14 and the implements 16 together with the downpressure on the tool bar 14, the tool bar 14 will raise, but force the hydraulic cylinder 72 to move and displace oil into the accumulators 76. When the accumulators 76 will not accept any more oil, the pressure on the cylinder 72 will raise and be relieved by the pressure relief valve 74 so that the hydraulic cylinder 72 can move to allow the parallelogram 18 to collapse and the tool bar 14 to raise.

A second embodiment of the present invention is shown in FIGS. 3 and 4. This linkage arrangement, generally designated by the numeral 100, includes a first parallel linkage 102 similar to the first parallel linkage 18 of the previously discussed embodiment 10. There is a pair of first vertical frame members 104 and a second vertical frame member 106 disposed a distance therefrom and in parallel relation thereto. The second vertical frame member 106 is longer than the first vertical frame members 104 and extends below the lower ends of them. A pair of first horizontal frame members 108 is pivotally connected at one end to the upper end of the second vertical frame member 106 and is pivotally connected to the upper ends of the first vertical frame members 104, however, not at its end 110, but approximately three-fourths of the way to its end 110. The end 110 extends beyond the first vertical frame member 104 toward the tractor 12. A pair of second horizontal frame members 112 has one end pivotally connected to the second vertical frame member 106 approximately three-fourths of the way from the upper end to the lower end thereof and is pivotally connected at its other end to the lower ends of the first vertical frame members 104. The lower ends of first vertical frame members 104 are secured to the tool bar 14 by bolts.

A second parallel linkage 116 connects the first parallel linkage 102 to the tractor 12. The second parallel linkage 116 includes a first link member 118 having a front portion 120 with a plurality of apertures 122 defined therethrough and a rear portion 124 having a plurality of corresponding apertures 126 defined therethrough. The length of the first link member 118 may be adjusted in the same manner as in the first embodiment 10 by aligning the apertures 122 and 126 and inserting a bolt 128 therethrough. The front portion 120 of the first link member 118 is pivotally connected to the three-point tractor hitch and the rear portion 124 is pivotally secured to a mounting bracket 130 disposed between the first vertical frame members 104.

A pair of second link members 132 is disposed beneath and in parallel relation to the first link member 118 of the second parallel linkage 116. The second link members 132 of the second parallel linkage 116 are substantially identical to the second link member 64 of the first embodiment 10 and are secured between the three-point hitch of the tractor 12 and the tool bar 14 in the same manner.

The force applying means connected between the first horizontal frame members 108 and the second horizontal frame members 112 consists of coil springs 134 having their upper ends secured to the first horizontal frame members 108 near the upper ends of the first vertical frame members 104. The lower ends of springs 134 are secured to interconnected spring anchors 136 disposed directly beneath the second horizontal frame members 112. The spring anchors 136 are adapted to slide along the length of the undersides of the second horizontal frame members 112 from near the second vertical frame member 106 when the first parallel linkage 102 is in the lowered position shown in FIG. 3, to near the first vertical frame members 104 when the first parallel linkage 102 is in the raised position shown in FIG. 4.

A pair of connecting links 138, attached at one end to an elbow 140 defined on the first link member 118 of the second parallel linkage 116 and attached at the other end to the first horizontal frame members 108 of the first parallel linkage 102 at the same point the upper ends of the coil springs 134 are attached, interconnects the first and second parallel linkages 102 and 116. This interconnection of the linkages 102 and 116 by connecting links 138 does not allow the second vertical frame member 106 to raise when the first vertical frame members 104 are raised to lift the tool bar 14, so that the hitch 142 carried by the second vertical frame member 106 remains at the predetermined height above the ground.

When the linkage arrangement 100 is in the lowered position shown in FIG. 3, downpressure is applied to the tool bar 1 by the coil springs 134. However, downpressure on the tool bar 14 is only desired when the linkage arrangement 100 is in the lowered position and not when in the raised position, as seen in FIG. 4. Therefore, a pair of relaxation linkages, generally designated by the numeral 144, is provided on the first parallel linkage 102 to ease the pressure when the linkage arrangement 100 is raised. Each relaxation linkage 144 consists of a first link 146 having one end connected at pivotal connection 148. A second link 150 has one end pivotally connected by bolt 152 at the end 110 of the first horizontal frame member 108 of the first parallel linkage 102 and the other end pivotally connected at 154 to the free end of the first link 146. A substantially L-shaped third link 156 has its upper end connected at 158 and the other end pivotally connected to a spring anchor 136.

When the linkage arrangement 100 is raised, the spring anchors 136 are coaxed along the underside of the second horizontal frame members 112, thereby urging the lower ends of the coil springs 134 toward the first vertical frame members 104 so that the coil springs 134 are substantially parallel thereto. When the coil springs 134 are substantially parallel to the first vertical frame members 104, the downpressure is eased to almost nothing.

Thus, it has been shown that the present invention provides a weight transfer linkage arrangement for connection between the three-point hitch of a tractor, a tool bar carrying agricultural implements and a hitch, whereby downpressure may be applied to the tool bar in its lowered position and the tool bar may be raised to disengage the agricultural implements carried thereon from contact with the ground without raising the hitch from its predetermined height above the ground.

Various features of the invention have been particularly shown and described in connection with the illustrated embodiments of the invention, however, it must be understood that these particular arrangements

What is claimed is:

1. A weight transfer linkage arrangement adapted to be connected to a three-point hitch of a tractor and to a vertically adjustable tool bar, said linkage arrangement including a first parallel linkage including a first vertical frame member connectable to said tool bar in a position generally perpendicular thereto, a second vertical frame member pivotally connected to said first vertical frame member so as to remain in parallel relation thereto, a first horizontal frame member pivotally connected between said first and second vertical frame members, a second horizontal frame member pivotally connected between said first and second vertical frame members so as to remain in parallel relation with said first horizontal frame member, a hitch extending from said second vertical frame member and supported solely thereby during operation, said hitch connectable to an agricultural implement, said first parallel linkage including means such that as the position of said tool bar is varied, said hitch is automatically maintained at a predetermined distance above the ground, a link member pivotally connectable at one end to said tractor and at the other end to said first vertical frame members, said link member disposed in parallel relation to a pair of lower three-point hitch links associated with said tractor, wherein said hitch links are pivotally connectable at one end to said tractor and at the other end to said tool bar, said link member and said hitch links cooperatively forming a second parallel linkage whereby said second parallel linkage is adaptable to raise or lower said tool bar and said first vertical frame member of said first parallel linkage, and a force applying means connected between said second horizontal frame member and said link member, said force applying means operative to exert a down pressure force on said tool bar.

2. The linkage arrangement of claim 1 wherein said link member is adjustable so as to vary the length thereof.

3. The linkage arrangement of claim 1 wherein said force applying means comprises at least one hydraulic cylinder remotely operable by the tractor operator.

4. The linkage arrangement of claim 3 including at least one pressure relief valve associated with said hydraulic cylinder to ease pressure on said cylinder.

5. The linkage arrangement of claim 3 including at least one accumulator associated with said cylinder to receive excess oil from said cylinder.

6. The linkage arrangement of claim 3 including a third linkage interconnecting said first parallel linkage and said second parallel linkage to transfer said down-pressure from said first horizontal frame member of said first parallel linkage to said tool bar.

* * * * *